United States Patent [19]

Blumhardt

[11] 4,128,107
[45] Dec. 5, 1978

[54] SURFACE IRRIGATION GATE
[75] Inventor: Harold Blumhardt, Ashley, N. Dak.
[73] Assignee: Blumhardt Mfg., Inc., Ashley, N. Dak.
[21] Appl. No.: 773,200
[22] Filed: Mar. 1, 1977
[51] Int. Cl.² ............................................. F16K 43/00
[52] U.S. Cl. ................................ 137/318; 29/157 R; 29/453; 405/51; 137/322; 251/145; 251/327; 277/DIG. 2; 285/3; 285/DIG. 22; 285/245; 138/94
[58] Field of Search ............. 29/157 R, 453; 137/318, 137/319, 320, 321, 322; 285/DIG. 22, 3, 4, 239, 240, 241, 245; 277/207.4, DIG. 2; 61/12, 13; 251/145, 327; 138/94, 94.3

[56] References Cited
U.S. PATENT DOCUMENTS

| | | | |
|---|---|---|---|
| 928,237 | 7/1909 | Baird | 285/239 |
| 1,065,839 | 6/1913 | Ritzman | 138/94.3 |
| 1,166,059 | 12/1915 | Ledbetter | 285/239 |
| 1,994,784 | 3/1935 | Porzel | 285/239 |
| 2,563,300 | 8/1951 | Aker | 61/12 |
| 2,925,990 | 2/1960 | Hempel | 251/145 |
| 2,958,545 | 11/1960 | Stelzer | 285/3 |
| 3,016,562 | 1/1962 | Reid | 29/453 |
| 4,000,620 | 1/1977 | Burge | 61/12 |

Primary Examiner—Martin P. Schwadron
Assistant Examiner—G. L. Walton
Attorney, Agent, or Firm—Merchant, Gould, Smith, Edell, Welter & Schmidt

[57] ABSTRACT

An outlet fitting construction for thin-walled, flexible plastic tubing for fluid distribution systems. The outlet fitting includes first and second outlet members that in the preferred embodiment are threadedly engaged and have aligned axial passageways. One outlet member is provided with an annular rim with a riding surface that facilitates insertion of the outlet fitting into an aperture in the flexible surface irrigation tubing. In an alternative embodiment a tube piercing member is provided that is engaged with the outlet members so that the outlet fitting may be inserted into a tube which does not have pre-existing apertures.

23 Claims, 8 Drawing Figures

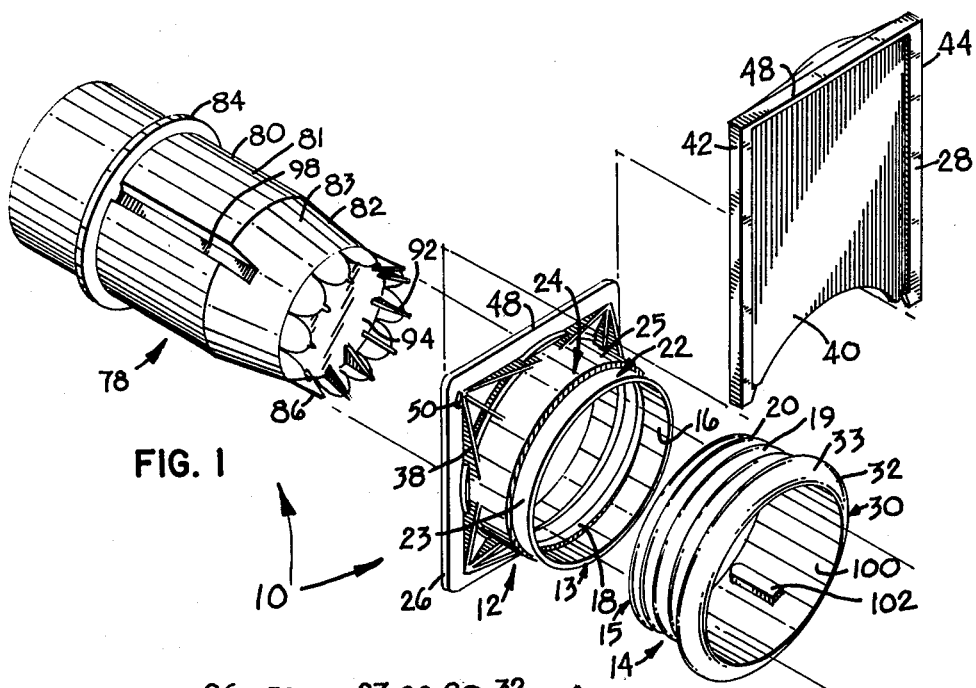
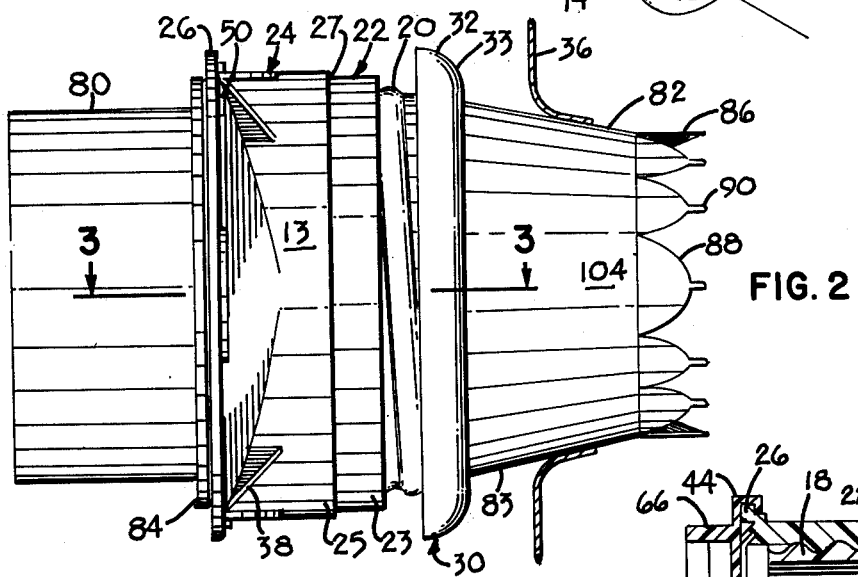
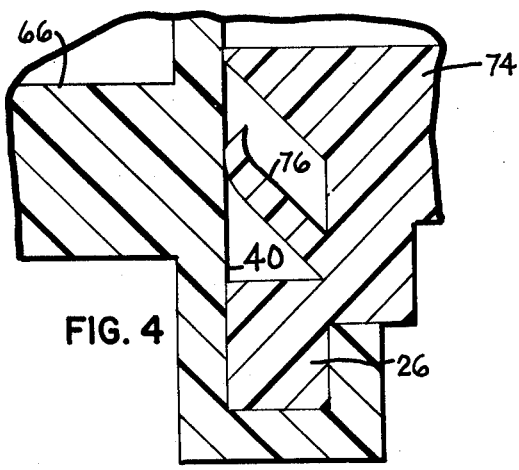
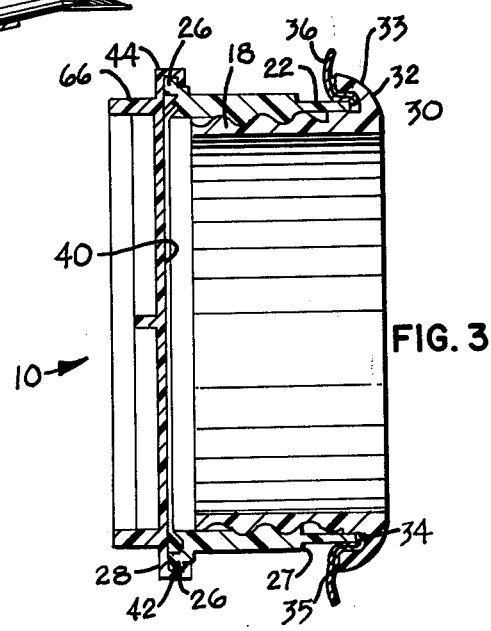

SURFACE IRRIGATION GATE

BACKGROUND OF THE INVENTION

The present invention relates to an outlet fitting construction suitable for use with thin-walled plastic tubing fluid distribution systems and, having certain advantages when used in surface irrigation applications with tubing having a thin, sheet-like, flexible plastic wall.

In the prior art, surface irrigation had been achieved by means of flooding of an entire field. This flooding method of surface irrigation results in significant water waste. To achieve the desired irrigation and yet conserve the water required, alternative methods of irrigation were sought.

One such alternative method that was developed includes the use of a thin, sheet-like, flexible plastic tubing having water outlet apertures. The tubing is laid in the field and filled with water. A valve means is inserted in the apertures in the tubing to regulate the irrigation water flow. On such method and apparatus is disclosed in U.S. Pat. No. 4,000,620 to Burge.

The present invention is an improved outlet fitting that can be readily attached to the flexible irrigation tubing. The present invention provides a more effective water-tight seal between the outlet fitting and the flexible tube than the prior art systems and devices. Additionally, in one embodiment the present invention is a simple device for creating an aperture in the flexible wall tube and attaching an outlet fitting within the aperture utilizing a single attachment tool, and has the important advantage that creating the aperture and attaching the fitting to fluid-filled tubing may be accomplished without fluid leakage.

SUMMARY OF THE INVENTION

The present invention is an outlet fitting construction for use with surface irrigation tubing having a thin, sheet-like, flexible plastic wall in which an outlet aperture of predetermined size is provided for attachment of the outlet fitting. The outlet fitting includes a first outlet member having a continuous side wall which defines a passageway between the ends of the outlet member. The fitting construction further includes a second outlet member also having a continuous side wall that defines a passageway between the ends of the second outlet member. One end of the second outlet member has a rim portion which defines a flange tapering outwardly along the second outlet member in the direction toward the opposite end of the second outlet member and which terminates in a contact surface that is directed generally toward the axis of the passageway in the second outlet member. The flange has an exterior dimension that is greater than the aperture in the flexible plastic wall and the outlet member is sized to be received within the passageway of the first outlet member. Finally, the outlet fitting construction includes a means for securing the first and second outlet members together with the wall of the flexible plastic tubing drawn over the flange on the second outlet member such that a portion of the wall surrounding the aperture is secured against the contact surface by the end of the first outlet member to provide a water-tight seal between the flexible wall tubing and the outlet fitting construction.

In the preferred embodiment, the first and second outlet members are tubular and the securing means includes internal threads on the first outlet member and mating external threads on the second outlet member. The first and second outlet members are threadedly engaged so that the second outlet member is initially partially screwed into the first outlet member to facilitate insertion of the rim portion through the tubing aperture followed by screwing the second oulet member into a sealing position with the tubing wall secured between one end of the first outlet member and the contact surface of the second outlet member. A valve means which includes a substantially planar rectangular gate slidably engaged with a planar flange on the first outlet member is provided to regulate the opening of the outlet fitting thereby controlling the water flow therethrough.

In some applications, the flexible wall tubing will not have apertures of predetermined size formed therein. Therefore, in an alternative embodiment, the outlet fitting construction further includes a tube piercing member that is axially and removably insertable within the first and second outlet members such that a piercing portion extends beyond one end of the second outlet member while a grasping portion extends beyond one end of the first outlet member. The tube piercing portion has a cutting edge and a riding surface which tapers outwardly from the cutting edge in a direction generally away from the longitudinal axis of the tube piercing member and toward the rim of the second outlet member. The outlet fitting construction is placed in the irrigation tubing by holding the grasping portion of the tube piercing member and puncturing an aperture in the tubing with the piercing portion. The edge of the flexible tubing that defines the thus punctured aperture rides up on the riding surface and over the rim portion of the second outlet member as the outlet fitting construction is axially inserted. The second outlet member may then be tightened against the first outlet member to provide the above-mentioned water-tight seal. The tube piercing member can then be removed from the outlet fitting construction. Preferably, the grasping portion of the tube piercing member is tubular having a cylindrical outer surface and the piercing portion of the tube piercing member is a frustum having its base fixed to the tubular member and a cutting edge defined at its truncated end. The external surface of the frustum defines the riding surface.

The outlet fitting construction also has a means for providing a water-tight seal between the rectangular gate and the outlet fitting. The seal means preferably includes a resilient annular lip formed integrally with the first tubular member at the opening in one end thereof. The annular lip has a top surface that is disposed in position to be engaged and compressed by the rectangular gate, the resilient engagement providing a water-tight seal. Latch means are also provided on the rectangular gate and a flange of the first tubular member to prevent removal of the gate from the flange.

The present invention thus provides an inexpensive and improved outlet fitting construction readily attachable to surface irrigation tubing after the tubing has been laid in the field and filled with water. These and other advantages of the invention will become apparent with reference to the accompanying drawings, description of the preferred embodiment, and claims.

BRIEF DESCRIPTION OF THE DRAWINGS

FIG. 1 is an exploded perspective view of one embodiment of the present invention;

FIG. 2 is a side elevation of one embodiment of the present invention illustrating the outlet fitting construction as it is inserted into a flexible wall tube which does not have apertures of predetermined size;

FIG. 3 is a sectional view taken along line 3—3 of FIG. 2 showing the outlet fitting subsequent to insertion;

FIG. 4 is an enlarged fragmentary view of a portion of FIG. 3;

DETAILED DESCRIPTION OF THE PREFERRED EMBODIMENT

Figure 6:
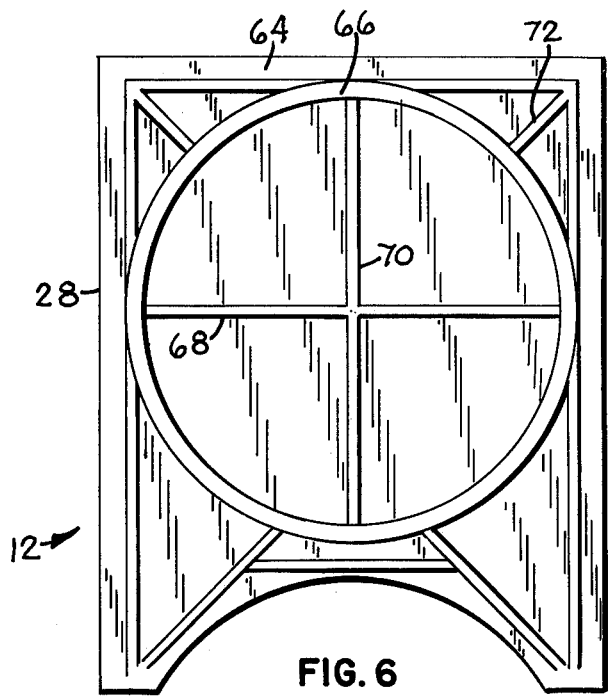
FIG. 6 is a view in elevation illustrating one side of the valve means of one embodiment of the present invention.

Referring to the drawings, wherein like numerals represent like parts throughout the several views, there is shown in FIG. 1 an exploded perspective view of an outlet fitting according to one embodiment of the present invention generally designated 10. Outlet fitting 10 includes first and second outlet members 12 and 14. In the preferred embodiment, outlet members 12 and 14 are basically tubular, each having a continuous side wall 13 and 15, respectively, defining axial passageways between the ends thereof. It will be understood that alternative embodiments in which first and second outlet members 12 and 14 are other than tubular are contemplated within the spirit and scope of the present invention. Side wall 13 has a substantially cylindrical inner surface 16 on which internal threads 18 are provided. Side wall 15 has an outer substantially cylindrical surface 19 on which external threads 20 that mate with internal threads 18 are provided to secure first and second outlet members together with their passageway axes aligned.

First outlet member 12 has a first tubular portion 22 at one end thereof and a second tubular portion 24 at the opposite end thereof. The inside diameters of first tubular portion 22 and second tubular portion 24 are equivalent, however, the outside diameter of first tubular portion 22 is less than the outside diameter of second tubular portion 24. Tubular portions 22 and 24 thus have substantially cylindrical outer surfaces 23 and 25, respectively, which meet to form a ridge 27. Disposed about the end of first outlet member 12 opposite the end at which first tubular portion 22 is located is a flange 26 which receives a gate member 28 as will be described in more detail hereafter.

Disposed at one end of second outlet member 14 is an annular rim portion 30. Annular rim portion 30 defines a flange 32 extending outward with respect to the axis of outlet member 14 and in a direction toward the opposite end of outlet member 14 and having an outer surface 33. Flange 32 terminates in a contact surface 35 directed generally toward the axis of outlet member 14. As shown more particularly in FIG. 5, flange 30 and surface 19 of second outlet member 14 define an annular groove 34 in which is received first tubular portion 22 of first outlet member 12. As shown in FIG. 3, when outlet fitting 10 is installed within an aperture in the wall of a flexible wall irrigation tubing, an edge 36 of the flexible tubing which defines the aperture is captured within groove 34 between annular rim portion 30 and first tubular portion 22 providing a water-tight seal between outlet fitting 10 and the flexible wall tubing. As will be described in more detail hereafter, during insertion of outlet fitting 10 into an aperture in the wall of flexible irrigation tubing, edge 36 of the tubing will ride along surface 33 until edge 36 is in position to be grasped between first tubular portion 22 and flange 32 within groove 34.

Figure 5:
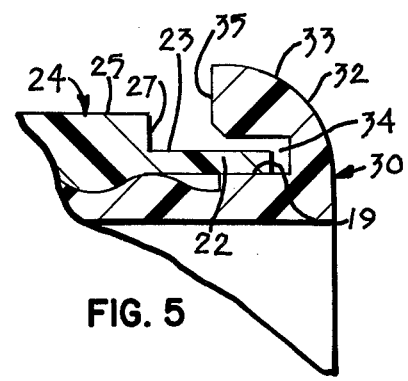
FIG. 5 is an enlarged fragmentary view of a portion of FIG. 3 showing the means for providing a water-tight seal between the edge of the flexible wall tube defining the aperture and the outlet fitting.

As illustrated in greater detail in FIG. 5, surface 33 of flange 32 tapers outwardly and rearwardly of rim portion 30 with an increasing exterior dimension. The exterior dimension is defined in this context as the distance between diametrically opposed points on surface 33 lying in a plane perpendicular to the axis of the passageway defined by tubular member 14. It is to be understood that this concept of exterior dimension is equally applicable to rim portion structures other than the annular configuration disclosed, and that the present invention is not limited to such annular rim structures.

Figure 7:
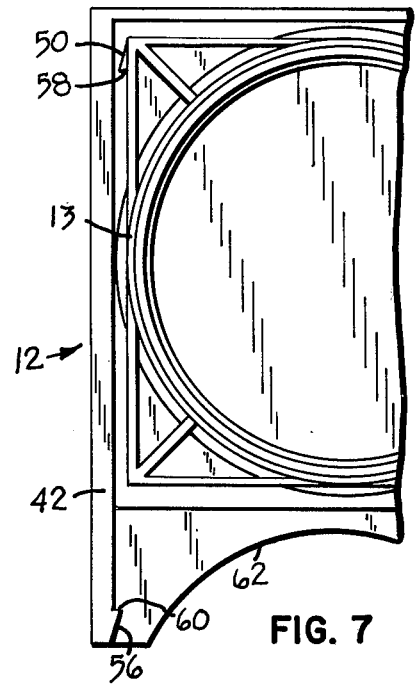
FIG. 7 is a view in elevation of the opposite side of the valve means with a portion thereof broken away.
Figure 8:
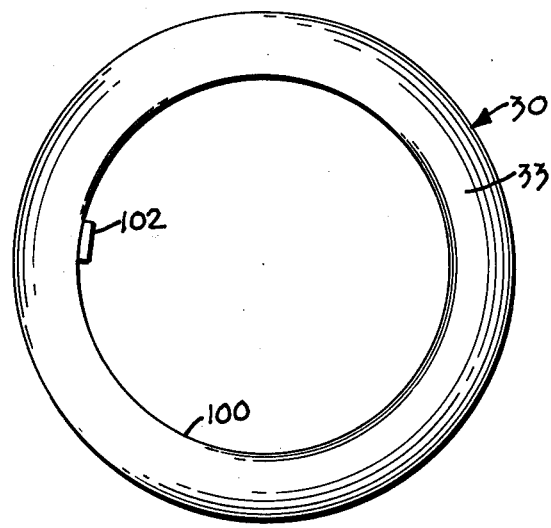
FIG. 8 is a view in elevation of the second outlet member.

Flange 26 of first outlet member 12 is substantially rectangular and disposed in a plane substantially perpendicular to the axis of first outlet member 12. A plurality of reinforcing elements as at 38 are formed integral with flange 26 and second tubular portion 24 providing support for flange 26. Gate member 28 is also a substantially rectangular plate having a planar surface 40. Disposed at the lateral edges of gate member 28 are a pair of U-shaped channels 42 and 44 into which the lateral edges of flange 26 are slidably received. A stop 46 is disposed at the top of gate member 28 closing the top ends of channels 42 and 44. Stop 46 is a planar member disposed substantially perpendicular and affixed to gate member 28 and engages a top surface 48 of flange 26 to retain gate member 28 against movement past a fully closed position on flange 26. Disposed proximate top surface 48 along the lateral edges of flange 26 are ramp-shaped latch members 50 and 52. A pair of mating latch members are disposed within channels 42 and 44 at the bottom end of gate member 28. In FIG. 7 one such mating latch member 56 is illustrated. Latch members 50 and 56 define mating engagement surfaces 58 and 60, respectively. When outlet fitting 10 is fully opened, surfaces 58 and 60 are engaged preventing removal of gate member 28 from flange 26. A cut-out is provided in gate member 28 at 62. The radius of curvature of cut-out 62 is substantially equal to the radius of the opening of the axial passageway in first outlet member 12.

FIG. 6 illustrates a surface 64 of gate member 28 opposite planar surface 40. Formed integrally with surface 64 is a circular reinforcing rim 66 having supporting cross membes 68 and 70. A plurality of additional reinforcing elements are formed on surface 64 as indicated, for example, at 72. The diameter of reinforcing rim 66 is substantially equal to the diameter of the opening at the flange end of first outlet member 12.

In FIG. 3 and FIG. 4 a means for providing a water-tight seal between planar surface 40 and flange 26 is illustrated. More particularly, positioned about the flange end opening of first outlet member 12 is a substantially rigid annular lip 74. Concentrically disposed about annular lip 74 is a second somewhat resilient annular lip 76. Flange 26 is slidably received within channels 42 and 44 so that planar surface 40 engages and compresses annular lip 76. This resiliently biased engagement between planar surface 40 and annular lip 76 provides a seal that prevents water leakage from outlet fitting 10 when gate member 28 is positioned to close the opening at flange end 26 of outlet member 12.

As described thus far, the outlet fitting of the present invention is for installation in flexible wall irrigation tubes having existing apertures therein. In some applications the irrigation tube will not have existing apertures. Therefore, in another embodiment of the present invention, a tube piercing member 78 is provided. Tube piercing member 78 has a grasping portion 80 and a piercing portion 82. In the preferred embodiment, grasping portion 80 is tubular having a cylindrical outer surface 81 and an annular flange 84 disposed about its periphery in a plane normal to the tubular axis. Piercing portion 82 is a frustum with its base secured to grasping portion 80 and having a cutting edge at its truncated end. Piercing portion 82 has an outwardly and rearwardly tapering surface 83 of increasing external dimension with respect to cutting edge 86. Cutting edge 86 includes a plurality of tooth-like projections 88, each terminating in pin-like piercing elements 90. Projections 88 are semi-elliptical in shape and circumferentially disposed about the truncated end of piercing portion 82. Ramp-like reinforcing supports 92 are formed integral with projections 88 and an end wall 94. Outer surfaces 82 and 83 have formed therein an elongated recessed key guide 98 having a longitudinal axis parallel to the axis of tube piercing member 78. Second outlet member 14 has an inner cylindrical surface 100 on which is provided a mating elongated key 102. Key 102 has a longitudinal axis that is parallel to the axis of outlet member 14. To secure tube piercing member 78 within outlet fitting 10 as shown in FIG. 3, key 102 is aligned with key guide 98 as tube piercing member 78 is axially inserted within outlet members 12 and 14. Annular flange 84 engages first outlet member 12 limiting the axial insertion of tube piercing member 78 within outlet fitting 10. The mating engagement of key 102 within key guide 98 prevents the rotation of tube piercing member 78 within second outlet member 14. Outer surface 83 of piercing portion 82 functions as a riding surface for edge 36 of flexible wall irrigation tubing as will be described in more detail with reference to the operation of the present invention.

The operation of the present invention will now be described. In the event that outlet fitting 10 is to be inserted in pre-existing apertures of predetermined size in flexible wall irrigation tubing, outlet member 14 is partially screwed within outlet member 12 as shown in FIG. 2. Outlet member 12 is held while fitting 10 is axially thrust into the aperture defined by edge 36 of a flexible wall tube. With pre-existing apertures, tube piercing member 78 is unnecessary. Edge 36 will ride along surface 33 of flange 32 expanding the aperture until flange 32 is within the interior of the flexible tube as shown in FIG. 3. Edge 36 at that point is in position to be held within groove 34 by tubular portion 22 and flange 32. Outlet member 12 and outlet member 14 are then tightened together securing edge 36 within groove 34 and providing a water-tight seal between outlet fitting 10 and the flexible wall tube. Gate 28 may then be positioned to control the size of the opening at the flange end of first outlet member 12 thereby regulating the flow of water through outlet fitting 10.

In some applications of the present invention, a flexible wall irrigation tube may be utilized which does not have pre-existing apertures formed therein. Outlet fittings 10 can then be inserted into the flexible wall tube utilizing tube piercing member 78 as will be described.

Outlet member 14 is partially screwed into outlet member 12 and tube piercing member 78 is axially inserted within outlet fitting 10 such that key 102 is received within key guide 98. Grasping portion 80 is held and cutting edge 86 is thrust against the flexible wall tubing. Projections 88 sever the flexible wall providing an aperture therein. Continued axial insertion of tube piercing member 78 within the flexible wall tube causes the edge 36 of the tube that defines the aperture to ride on surface 83 gradually expanding the size of the aperture. Edge 36 then rides about the surface 33 of flange 32 until edge 36 is in position to be retained within groove 34 by flange 32 and tubular portion 22. Grasping portion 81 is held while first outlet member 12 is tightened to second outlet member 14 retaining edge 36 firmly within groove 34 providing a water-tight seal. Outlet member 14 is held against rotation while outlet member 12 is tightened by virtue of the engagement between key 102 within key guide 98. Tubular piercing member 78 is then removed from outlet fitting 10 leaving outlet fitting 10 in place. It will be understood that during insertion of tube piercing member 78 within the flexible wall tube, the end wall 94 prevents excessive water loss by closing the axial passageway through outlet fitting 10. Once tube piercing member 78 is removed, water will begin to flow through outlet fitting 10, however, gate 28 can be rapidly moved to the closed position shutting off the water flow.

In use, with gate 28 in a closed position reinforcing rim 66 aids in achieving a water-tight seal between annular lip 76 and planar surface 40. In particular, reinforcing rim 66 provides structural support to planar surface 40 at its resilient engagement with annular lip 70. As previously mentioned, stop 46 on gate member 28 retains gate member 28 in a fully closed position while the mating latch members 50 and 56 prevent removal of gate member 28 beyond a fully open position.

From the above description, it is apparent that the present invention is an outlet fitting adapted to be quickly and easily inserted, in one embodiment, into pre-existing apertures in flexible wall irrigation tubing. In yet another embodiment, the present invention includes a piercing member removably attached to the outlet fitting so that the fitting can be inserted in the tubing by puncturing an aperture therein. A water-tight seal is achieved between the outlet fitting and flexible tube by providing outlet members that are tightened to each other to grasp the edge of the flexible tube that defines the aperture therebetween. The present invention therefore is an improved outlet fitting for flexible wall surface irrigation tubing.

What is claimed is:

1. An outlet fitting construction for use with surface irrigation tubing having a thin, sheet-like, flexible plastic wall in which an outlet aperture of predetermined size is provided for attachment of the outlet fitting, comprising:
  (a) a first outlet member having a continuous side wall defining a first passageway between first and second ends thereof;
  (b) a second outlet member having a continuous side wall defining a second passageway between first and second ends thereof, said first end of said second outlet member having a rim portion defining a flange tapering outwardly along said member in the direction of said second end and terminating in a contact surface directed generally toward the axis of said second passageway, said flange having exterior dimensions greater than said aperture size, said second outlet member being sized to be received within said first passageway and generally conforming thereto; and (c) means for securing said first and second outlet members with said wall drawn over said flange and a portion of said wall surrounding said aperture being secured against said contact surface by said first end of said first outlet member to provide a water-tight seal between said tubing and said fitting construction.

2. An outlet fitting in accordance with claim 1 wherein said first and second outlet members are tubular each having a longitudinal axis and said securing means further comprises internal threads on said first outlet member and mating external threads on said second outlet member whereby said first and second outlet members may be threadedly engaged so that said second outlet member may initially be partially screwed into said first outlet member with said longitudinal axes aligned to facilitate insertion of said rim portion thereof through said tubing aperture, and subsequently said second outlet member may be screwed into a sealing position with said wall secured between said first end of said first outlet member and said contact surface.

3. An outlet fitting in accordance with claim 2 further comprising valve means engagable with said second end of said first outlet member to control the size of the opening at said second end thereby regulating the flow of water from said outlet fitting.

4. An outlet fitting in accordance with claim 3 wherein said valve means comprises:

(a) a substantially planar flange affixed to said first outlet member at said second end thereof and disposed generally transverse to said passageways; and (b) a rectangular gate having a planar surface and a pair of oppositely disposed channel members, said planar flange slidably received within said channel members so that said gate is movable in a plane normal to said aligned axes to regulate the opening at said second end of said first outlet member.

5. An outlet fitting in accordance with claim 4 further comprising:

(a) a resilient annular lip formed integrally with said first outlet member at said opening at said second end thereof, said annular lip having a top surface disposed in position to be engaged and compressed by said planar surface of said gate, said resilient engagement between said planar surface and said annular lip providing a water-tight seal between said first outlet member and said rectangular plate.

6. An outlet fitting in accordance with claim 5 further comprising mating latch means on said gate and said planar flange to prevent removal of said plate from said flange.

7. An outlet fitting in accordance with claim 6 wherein said mating latch means further comprises ramp members affixed to said flange and said rectangular gate, said ramp members defining mating contact surface.

8. An outlet fitting for flexible wall surface irrigation tubing in which apertures are provided to discharge water, comprising:

(a) a first outlet member having a continuous side wall defining a first axial passageway between first and second ends thereof; and (b) a second outlet member having a continuous side wall defining a second axial passageway between first and second ends thereof, said second outlet member having a rim portion about the opening at said first ends thereof, said second end of said second outlet member received within said first end of said first outlet member with the axes of said passageways aligned for axial translation of said second outlet member between a first extended position in which said outlet fitting is inserted into an aperture in said tubing and a second tightened position in which said rim portion may secure a portion of said flexible wall surrounding the aperture against said first outlet member providing a water-tight seal thereabout;

said rim portion having a riding surface thereon, said riding surface extending outwardly away from said axis of said second outlet member and rearwardly from the opening at said first end of said second outlet member and having an exterior dimension greater than the size of the aperture, whereby upon insertion of said outlet fitting through the aperture the edge of said flexible wall defining the aperture is engaged by said riding surface and caused to expand until said rim portion is within the interior of said irrigation tubing with said portion of said tubing wall in position to be secured against said first outlet member by said rim portion.

9. An outlet fitting in accordance with claim 8 wherein said first and second outlet members are tubular, said first outlet member being provided with external threads and said second outlet member having mating external threads whereby said second outlet member may be threadedly engaged within said first outlet member, said second outlet member partially screwed into said first outlet member in said first extended position and said second outlet member tightened to said first outlet member in said second tightened position.

10. An outlet fitting in accordance with claim 9 further comprising gate means secured to said second end of said first outlet member to control the opening size at said second end of said first outlet member thereby regulating water flow therethrough.

11. An outlet fitting in accordance with claim 10 wherein said gate means further comprises:

(a) a substantially planar flange secured to said first outlet member at said second end thereof, said planar flange disposed in a plane normal to said aligned axes of said first and second outlet members; and (b) a rectangular gate having a planar surface and a pair of oppositely disposed channel members, said planar flange slidably received within said channel members so that said gate is movable in a plane normal to said aligned axes.

12. An outlet fitting in accordance with claim 11 further comprising a resilient annular lip formed integrally with said first outlet member at said opening at said second end thereof, said annular lip having a top surface disposed in position to be engaged and compressed by said planar surface of said rectangular gate, said resilient engagement between said planar surface and said annular lip providing a water-tight seal between said plate and said first outlet member.

13. An outlet fitting in accordance with claim 12 further comprising mating latch means on said plate and said planar flange preventing removal of said plate from said flange.

14. An outlet fitting in accordance with claim 13 wherein said mating latch means further comprises ramp members affixed to said flange and said rectangular gate, said ramp members defining mating contact surface.

15. An outlet fitting for flexible wall surface irrigation tubing in which apertures are punctured to discharge water, comprising:
(a) a first outlet member having a continuous side wall defining a first axial passageway between first and second ends thereof;
(b) a second outlet member having a continuous side wall defining a second axial passageway between first and second ends thereof, said first end of said second outlet member having a rim portion and said second end of said second outlet member received within said first end of said first outlet member with said axes aligned for axial translation of said second outlet member between a first extended position in which said outlet fitting is inserted into an aperture in said tubing and a second tightened position in which said rim portion secures the edge of said flexible wall defining said aperture against said first outlet member providing a water-tight seal thereabout; and
(c) a tube piercing member having a longitudinal axis and piercing and grasping portions, said tube piercing member axially and removably insertable within said first and second outlet members such that said piercing portion extends beyond said first end of said second outlet member and said grasping portion extends beyond said second end of said first outlet member, said piercing portion having a cutting edge and a riding surface tapering outwardly from said cutting edge in a direction generally away from said longitudinal axis toward said rim of said second outlet member; and
means for securing said tube piercing member to said second outlet member whereby said outlet fitting may be placed in said irrigation tubing by holding said grasping portion of said tube piercing member and puncturing an aperture in said tubing with said piercing portion, the edge of said flexible tubing defining said aperture riding up said riding surface and over said rim portion during insertion, and said second outlet member may then be tightened against said first outlet member to provide said water-tight seal.

16. An outlet fitting in accordance with claim 15 wherein said grasping portion of said tube piercing member is tubular and said piercing portion of said tube piercing member is a frustum with its base affixed to said tubular member and with said cutting edge defined at its truncated end, the external surface of said frustum defining said riding surface.

17. An outlet fitting in accordance with claim 16 wherein said securing means further comprises an elongated key guide formed in the outer surface of said piercing member, said key guide having an axis parallel to the longitudinal axis of said piercing member, and an elongated key formed in the inner surface of said second outlet member, said key having an axis parallel to said axis of said second outlet member, said key being received within said key guide to secure said tube piercing member to said second outlet member.

18. An outlet fitting in accordance with claim 17 wherein said first and second outlet members are tubular, said first outlet member having internal threads and said second outlet member having mating external threads whereby said first and second outlet members may be threadedly engaged, and said second outlet member rim portion is annular.

19. An outlet fitting in accordance with claim 18 wherein said first outlet member has a flange affixed to said first end of said first outlet member, said flange being substantially planar and disposed in a plane generally perpendicular to said axis of said first outlet member and further comprising a gate member slidably engaged with said planar flange and movable in a plane generally perpendicular to said axis of said passageway to regulate the opening at said first end of said first tubular member.

20. An outlet fitting in accordance with claim 19 wherein said gate member is a rectangular gate having a planar surface that slidably engages said planar flange of said first tubular member, and further comprising seal means for providing a water-tight seal between said planar flange and said planar surface of said rectangular gate.

21. An outlet fitting in accordance with claim 20 wherein said seal means further comprises a resilient annular lip formed integrally with said first tubular member at said opening at said first end, said annular lip having a top surface disposed in position to be engaged and compressed by said planar surface of said gate, said resilient engagement between said planar surface and said annular lip providing said water-tight seal.

22. An outlet fitting in accordance with claim 21 further comprising mating latch means on said gate and said planar flange preventing removal of said gate from said flange.

23. An outlet fitting in accordance with claim 22 wherein said mating latch means further comprises ramp members affixed to said flange and said rectangular gate, said ramp members defining mating contact surfaces.

* * * * *